(12) United States Patent
de Moor

(10) Patent No.: US 9,015,193 B1
(45) Date of Patent: Apr. 21, 2015

(54) RECURSIVE AGGREGATES

(71) Applicant: Semmle Limited, Oxford (GB)

(72) Inventor: Oege de Moor, Oxford (GB)

(73) Assignee: Semmle Limited (GB)

( * ) Notice: Subject to any disclaimer, the term of this patent is extended or adjusted under 35 U.S.C. 154(b) by 0 days.

(21) Appl. No.: 14/292,581

(22) Filed: May 30, 2014

(51) Int. Cl.
G06F 17/30 (2006.01)

(52) U.S. Cl.
CPC .... *G06F 17/30424* (2013.01); *G06F 17/30595* (2013.01)

(58) Field of Classification Search
CPC ............ G06F 17/30424; G06F 17/30595
USPC ......... 707/773, 774, 775, 791, 797, 798, 803, 707/769, 804
See application file for complete search history.

(56) References Cited

U.S. PATENT DOCUMENTS

| | | | | |
|---|---|---|---|---|
| 2002/0029207 | A1* | 3/2002 | Bakalash et al. | 707/1 |
| 2002/0198872 | A1* | 12/2002 | MacNicol et al. | 707/3 |
| 2003/0204499 | A1* | 10/2003 | Shahabi et al. | 707/3 |

OTHER PUBLICATIONS

Hans-J. Lenz et al., OLAP Databases and Aggregation Functions, 2001, IEEE, 91-100.*

* cited by examiner

*Primary Examiner* — Jean B Fleurantin
(74) *Attorney, Agent, or Firm* — Fish & Richardson P.C.

(57) ABSTRACT

Methods, systems, and apparatus, including computer programs encoded on computer storage media, for expressing and evaluating aggregation functions, including aggregation functions in the context of recursive aggregates, in data languages that implement fixed point semantics. One of the methods includes receiving input specifying, explicitly or implicitly, an aggregation function agg having an input type and an output type, a relation s that has a domain and a range and that represents one or more entities to be aggregated over, and a relation t that is a relation from the range of s to the input type of the aggregation function agg; and evaluating an aggregation construct agg* to calculate a relation between the domain of s and the output type of the aggregation function agg according to agg*(s, t)={(m, agg(n))|∃d: (m,d)∈s,n∈π{|t(y)|y∈s(m)|}}.

24 Claims, 4 Drawing Sheets

RECURSIVE AGGREGATES

BACKGROUND

This specification relates to data processing, in particular, to processing recursively defined relations.

A relation is a set of tuples $(t_1, \ldots t_n)$, each tuple having $n \geq 1$ data elements $t_i$. Each element $t$, is a value of a corresponding attribute, which has an attribute name. Relations are commonly thought of as, represented as, and referred to as tables in which each row is a tuple and each column is an attribute. For convenience, as is conventional, the tuples will be presented as being ordered.

In the SQL programming language, relations can be created with a CREATE TABLE statement or with a common table expression, for example. Other languages have corresponding functionality.

To introduce an example that will be used in the remainder of this specification, the graph shown in FIG. 1 can be represented by a table of nodes, illustrated in FIG. 2a, and a table of edges, illustrated in FIG. 2b. A row of the form (x, y) in the table of edges represents a directed edge in the graph from node x to node y.

The table of nodes can be created in SQL with the following commands:

create table nodes
    node varchar);
  insert into nodes
  values ('a'), ('b'), ('c'), ('d'), ('e');

The table of edges can be created in SQL with the following commands:

CREATE TABLE edges (
    parent varchar,
    child varchar);
  insert into edges (parent, child)
  values ('a', 'b'), ('a', 'c'), ('c', 'd'), ('c', 'e');

A relation can also be defined recursively, as shown in the SQL recursive query example, below. Other languages have corresponding functionality.

Recursive queries are queries that reference their own output. A common use for recursive queries is calculating on graphs. For example, a recursive query on a graph might be used to determine the depth of a node, defined to be the longest length of all paths from that node to a leaf. Thus, in the graph of FIG. 1, nodes b, d and e each have a depth of 0; the depth of node c is 1; and the depth of node a is 2.

The following example is a recursive query on a graph, e.g., that of FIG. 1, that determines the depths of the nodes of the graph. In the example, the SELECT node, max (depth) FROM depth_table statement returns a depth for each node.

To calculate the depth of the nodes in the graph, a depth table depth_table is defined recursively that contains the lengths of all the paths from each node to a leaf, then the SELECT statement aggregates over the depth table:

WITH RECURSIVE depth_table (node, depth) AS
  (
  /* Nonrecursive term */
  /* each node with no children has a depth of 0 */
  SELECT node, 0 FROM nodes n
  WHERE NOT EXISTS (select * from edges e where
    e.parent=n.node)
  UNION
  /* Recursive term */
  /* each node with a child of depth n has a depth n+1 */
  SELECT e.parent, dt.depth+1
  FROM depth_table dt
  INNER JOIN edges e ON dt.node=e.child
  )
  SELECT node, max(depth) FROM depth_table
  GROUP BY node;

The definition of depth_table is recursive because depth_table is used in the definition of itself. The WITH RECURSIVE clause defines a common table expression. This expression defines a temporary table used by a SELECT clause. Common table expressions take the form of a nonrecursive term unioned—using either UNION or UNION ALL—with a recursive term.

FIG. 3 illustrates the logic of an example prior art process that evaluates a recursive definition. For example, to evaluate a common table expressions, an SQL evaluator, implemented in computer program instructions, can perform a process implementing the logic illustrated in FIG. 3, or an optimization of that logic. The process evaluates the nonrecursive term and stores the results in a current table (300). The process branches depending on whether the common table expression uses a UNION or a UNION ALL (302). If the common table expression uses a UNION, the process discards duplicate rows from the current table (304) and then compares the current table to a previous table, which is initially empty (306). If the common table expression uses a UNION ALL, the process goes directly to comparing the current table to the previous table (306). If the two tables are the same, the process is done (308). If not, the process replaces the contents of the previous table with the contents of the current table (310). The process then evaluates the entire term, using the previous table for the recursive reference and storing the results in the current table (312). The process loops back to compare the current table to the previous table (306), first discarding rows (304) if the common table expression uses a UNION.

The usual declarative semantics of a recursive relation, whether defined in SQL or in a logic programming language, e.g., Datalog, is that the defined relation is the least fixed point of successive applications of the definition to the empty relation. This is illustrated in the following Table 1, which shows the results of applying the logic illustrated in FIG. 3 to the query shown above.

TABLE 1

| Stage | Previous table | Current table | Comments |
|---|---|---|---|
| 0 | empty | (b, 0) (d, 0) (e, 0) | Results of the nonrecursive term: all nodes with no children have a depth of 0. |
| 1 | (b, 0) (d, 0) (e, 0) | (b, 0) (d, 0) (e, 0) (a, 1) (c, 1) | Using the previous table to define the current table at this stage yields tuples for the parents a and c of b, d, and e. |
| 2 | (b, 0) (d, 0) (e, 0) (a, 1) (c, 1) | (b, 0) (d, 0) (e, 0) (a, 1) (c, 1) (a, 2) | a has no parent, but c does. Thus, this stage yields a second tuple for a. |
| 3 | (b, 0) (d, 0) (e, 0) (a, 1) (c, 1) (a, 2) | (b, 0) (d, 0) (e, 0) (a, 1) (c, 1) (a, 2) | The previous and current tables are equal, so the process terminates. |

The evaluation strategy iterates from the empty relation, applying the common table expression on the results table again and again until applying the expression does not change the table, that is, until a fixed point is reached. However, this procedure does not define the semantics of the recursive relation. An implementation, in SQL or otherwise, can perform the computation in any way that yields the least fixed point.

Any recursive query Q defines a non-recursive operator on relations, which takes a relation T and yields the relation Q(T)

which results from substituting T into the definition of Q. The semantic value of Q is then the least fixed point of the non-recursive operator when applied to the empty relation. For such a recursive query to be well defined, it is essential that the operator be monotonic on its input relation. A query is monotonic by definition when $S \subseteq T \rightarrow Q(S) \subseteq Q(T)$, for every relation S. In the present context, if a query is monotonic, then when the query has executed using the previous table as the recursive reference, every row in the previous table must exist in the current relation. That is, a monotonic query only adds results to the previous table; it never removes them. As can be seen, this property holds in Table 1; the previous table is always completely contained in the current table.

SUMMARY

This specification describes a technology that allows the embedding of an aggregation expression directly in the recursive term of a recursive definition of a relation, e.g., in a recursive query. This specification describes implementations of recursive aggregates, that is, of calls to aggregation functions inside of recursive queries, in query languages, e.g., SQL and Datalog, that evaluate recursive queries by iterating from the empty relation until a fixed point is reached, or that define recursion in that way. The technologies implementing recursive aggregates maintain monotonicity of the aggregation expression, which guarantees that fixed points exist.

The technologies thus overcome a well-known problem. Because selection expressions containing aggregation functions, e.g., sum and max, are not guaranteed to be monotonic, recursive evaluation of non-monotonic expressions is not guaranteed to reach a fixed point. Thus, recursive aggregates are not allowed in many query languages that support recursion, e.g., SQL and Datalog. Instead the query writer must perform an auxiliary query and then aggregate over the results of the query.

The subject matter described in this specification can be implemented in particular embodiments so as to realize one or more of the following advantages. Problems can be expressed in query languages in simple, intuitive ways by using a notation for recursive aggregates that can be evaluated to yield correct and consistent results. Convergence to a correct fixed point is guaranteed, even when the recursion occurs over cyclic data structures. Evaluating the recursive definition is space efficient: the conventional alternative of performing a query and then aggregating over the resulting table requires that the entire result table be materialized. Aggregating as the query runs can take constant space.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figures 1, 2A, 2B:
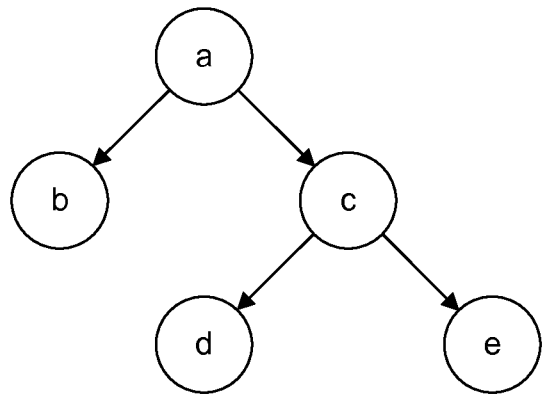
FIG. 1 illustrates a simple graph that will be used in examples presented in this specification.
FIGS. 2a and 2b illustrate an example table of nodes and an example table of edges, respectively, that represent the graph of FIG. 1.

This specification describes technologies that allow an aggregation function to be included in the recursive term of a recursive definition of a relation.

Briefly, monotonic aggregation constructs are added to the query language, to be used whenever aggregation is desired. The construct corresponding to a particular aggregation function agg will be denoted as agg*. Thus the aggregation construct corresponding to the aggregation function max will be written max*, and similarly for sum*, count*, and so on. As the semantics of all the aggregation constructs only differ by what aggregation function is called, this can be viewed as adding to the query language a single aggregation construct that is parameterized by any of the language's aggregation functions. Common aggregation functions include count, max, min, average, and sum.

The aggregation construct takes two relations and returns a relation, not a single value. Because it is a common case, and for ease of presentation, the construct will be described in terms of binary relations; however, in the general case, the construct allows columns of tuples or a multi-column schema. SQL, as noted above, represents relations as tables and views, so the terms table and relation will be used interchangeably. The aggregation construct is monotonic in its second relation. A call to or evaluation of agg*(s, t) calculates a relation between the domain of s and the output type of the agg function. The relation s represents the entities that are being aggregated over, e.g., the children of a node in a graph. The relation t must be a relation from the range of s to the input type of the aggregation function agg. The output of agg* is a relation between the domain of s and the output type of the aggregation function agg, which is commonly integer for aggregation functions such as count, max, and sum.

The semantics of the aggregation construct agg* are defined, in set-builder notation, as follows:

$$\text{agg}^*(s,t) = \{(m, \text{agg}(n)) | \exists d : (m,d) \in s, n \in \pi\{|t(y)|y \in s(m)|\}\} \quad \text{(Def. 1)}$$

where the notation $\{|\ldots|\}$ denotes bag comprehension, that is, forming a bag, i.e., a multiset, by stating its properties, $\pi$ is the n-ary Cartesian-product function that takes a bag of sets and returns a set of bags, and the notation r(x) for a binary relation r means $\{y|(x, y) \in r\}$, which is a set comprehension, not a bag comprehension. Any n-ary relation for n>2 is isomorphic to a binary relation with a k-ary domain and m-ary range such that k+m=n. Thus, if the relation r has more than two terms in its tuple, i.e., when the table representation of r has more than two columns, and a domain and range of the relation have been specified, x is taken from the domain and y is taken from the range.

Similarly, if the relation s is an n-ary relation for n>2, and a domain and range of s have been specified, the m and d in "(m, d)∈s" are taken from the domain and range of s, respectively.

The use of bags is important because aggregation functions are usually sensitive to duplicates, so set deduplication would produce incorrect aggregated values. For example, it is important to distinguish between sum(1,1,2) and sum(1,2).

In particular implementations, any convenient data structures could be used that can represent the properties of the relations, sets, and bags. For example, a list data structure rather than a bag data structure could be used to represent a bag, even though order does not matter in a bag. Also, any convenient syntax other that agg* (s, t) expressing the same overall semantics could be used.

With this new monotonic max* aggregation construct, the depth query can be written in SQL as follows:

with recursive depth_table (node, depth) as
(
 /* Nonrecursive term */
 /* each node with no children has a depth of 0 */
 select node, 0 from nodes n
   where not exists (select * from edges e where
      e.node=n.node)

union
 /* Recursive term */
 /* each node with a child of depth n has a depth n+1 */
 max* (edges, (select node, depth+1 from depth_table))
)
select * from depth_table;

This query executed with the semantics of the aggregation construct described above yields the correct behavior shown in Table 2.

TABLE 2

| Stage | Previous table | Current table | Comments |
|---|---|---|---|
| 0 | empty | (b, 0) (d, 0) (e, 0) | Results of the nonrecursive term: all nodes with no children have a depth of 0. |
| 1 | (b, 0) (d, 0) (e, 0) | (b, 0) (d, 0) (e, 0) (c, 1) | Note that c's depth is calculated here, but a's depth is not. This is explained below. |
| 2 | (b, 0) (d, 0) (e, 0) (c, 1) | (b, 0) (d, 0) (e, 0) (c, 1) (a, 2) | The depth of a is calculated here. |
| 3 | (b, 0) (d, 0) (e, 0) (c, 1) (a, 2) | (b, 0) (d, 0) (e, 0) (c, 1) (a, 2) | The previous and current tables are equal, so the process terminates. |

Figure 3:
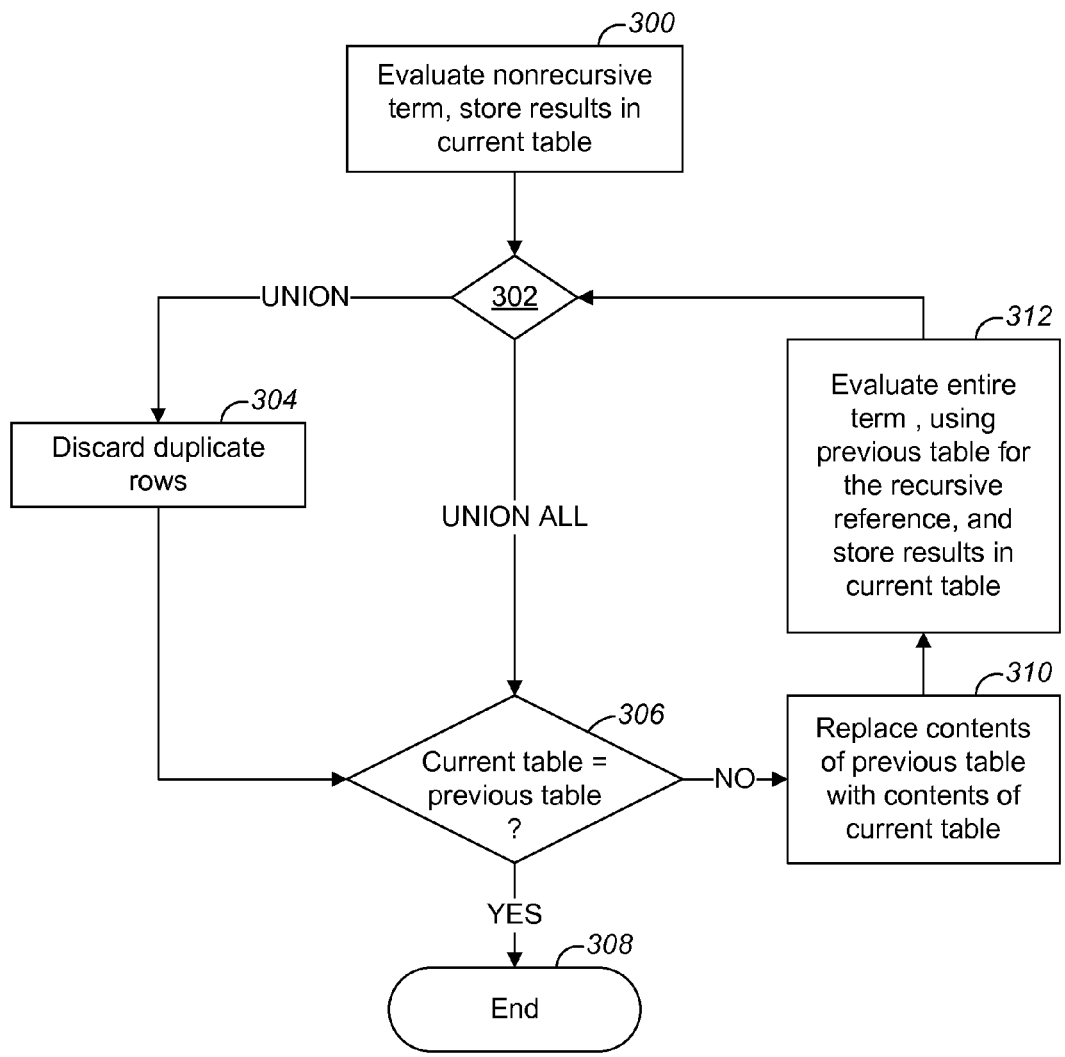
FIG. 3 (prior art) illustrates the logic of an example process that evaluates a recursive definition.
Figure 4:
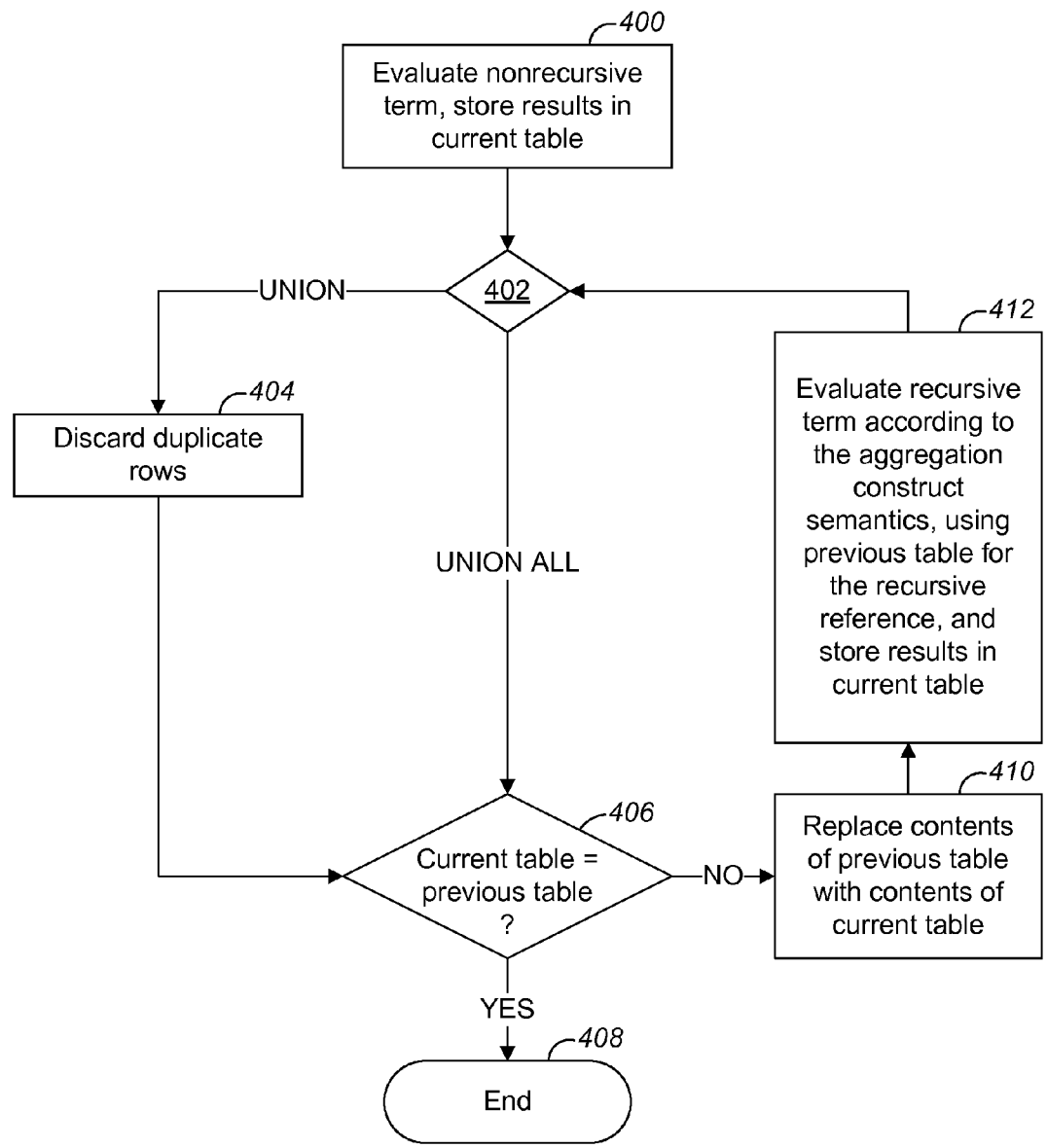
FIG. 4 illustrates the logic of an example process that evaluates a recursive aggregate definition in accordance with the novel aspects of this specification.

FIG. 4 illustrates the logic of an example process that differs from the process of FIG. 3 in that it evaluates a recursive aggregate definition in accordance with the novel aspects of this specification. For example, to evaluate a common table expressions, an SQL evaluator, implemented in computer program instructions, might perform a process implementing the logic illustrated in FIG. 4, or an optimization of that logic. The process evaluates the nonrecursive term and stores the results in a current table (400). The process branches depending on whether the common table expression uses a UNION or a UNION ALL (402). If the common table expression uses a UNION, the process discards duplicate rows from the current table (404) and then compares the current table to a previous table, which is initially empty (406). If the common table expression uses a UNION ALL, the process goes directly to comparing the current table to the previous table (406). If the two tables are the same, the process is done (408).

If not, the process replaces the contents of the previous table with the contents of the current table (410). The process then evaluates the recursive term according to the aggregation construct semantics, using the previous table for the recursive reference in the recursive term and storing the results in the current table (412). The process loops back to compare the current table to the previous table (406), first discarding rows (404) if the common table expression uses a UNION.

In reference to the evaluation as illustrated in Table 2, note that a value is not produced for node a until stage 2, after all the children of node a have been evaluated. How this arises from the semantics will now be described.

TABLE 3

| s | | t | |
|---|---|---|---|
| a | b | b | 1 |
| a | c | d | 1 |
| c | d | e | 1 |
| c | e | | |

Table 3 shows the relations passed to max* in stage 1 of the process illustrated in Table 2. The evaluation of max* on these relations will be described now in more detail. As described above, s is a relation from nodes to nodes, and it represents the entities being aggregated over, i.e., the child nodes of the graph; and t is a relation from the range of s, i.e., nodes, to the input type of the aggregation function max, integer in this example, and represents the values that will be aggregated by the aggregation construct. The output of max* is therefore a relation between nodes and integers, that is, a set of (node, integer) tuples.

The definition of agg* takes the following form, when the aggregation function is max.

$$\max^*(s,t) = \{(m, \max(n)) | \exists d: (m,d) \in s, n \in \pi\{|t(y)| y \in s(m)|\}\}$$

There are two values m such that $\exists d: (m, d) \in s$, namely a and c.

For m=c, $\pi \{| t(y) | y \in s(c) |\}$
$= \pi \{| t(y) | y \in \{d, e\} |\}$    // (c, d) ∈ s and (c, e) ∈ s, so s(c) = {d, e}
$= \pi \{| t(d) |\} \cup \{| t(e) |\}$    // follows from the definition of bag comprehension
$= \pi (\{| \{1\} |\} \cup \{| \{1\} |\})$    // (d, 1) ∈ t, so t(d) = {1}. Similarly for t(e).
$= \pi \{| \{1\}, \{1\} |\}$    // follows from the definition of bag union
$= \{\{| 1, 1 |\}\}$    // follows from the definition of Cartesian product As expected, for m=c, the single tuple (c, max({|1, 1|}))= (c, 1) is produced. The case when m=a is more interesting:

$\pi\{|t(y)|y \in s(a)|\}$ $= \pi\{|t(y)|y \in \{b,c\}|\}$ $= \pi(\{|t(b)|\} \cup \{|t(c)|\})$ $= \pi(\{|\{1\}|\} \cup \{|\{\}|\})$ $= \pi(\{|\{1\}, \{\}|\})$ $= \{\}$ The set that n draws its values from is empty. Thus, no tuples at all are produced when m=a.

Putting all this together, one sees that $$\max{}^*(s,t) = \{(m, \max(n)) | \Sigma d: (m,d) \in s,\\ n \in \pi\{|t(y)| y \in s(m)|\}\} = \{(c,1)\}$$

This is precisely what is added to the previous table to make the current table in stage 1 shown in Table 2.

The SQL evaluation process, illustrated in FIG. 4, will now be described using the s and t tables of Table 3. The description begins after the process has finished stage 0 and has replaced the contents of previous table with the contents of current table, so previous table=current table=(b,0) (d,0) (e,0).

The process then, at the beginning of stage 1, evaluates the entire term, using previous table for the recursive reference. To do this, the process executes the non-recursive select, yielding (b,0) (d,0) (e,0). This will always yield the same result, and a real evaluation engine will not evaluate it more than once. The process then forms the union of this with the results of the recursive term, using previous table, which now is (b,0) (d,0) (e,0), as the recursive reference. This produces max* ((a,b) (a,c) (c,d) (c,e), (b,1) (d,1) (e,1))=(c,1)

as described above.

The result of forming the union of the non-recursive term—which yielded (b,0) (d,0) (e,0)—with the recursive term—which yielded (c,1)—is (b,0) (d,0) (e,0) (c,1). Again, following the semantics of FIG. 4, the evaluation process stores these results in the current table. The process discards any duplicate rows—in this case there are none—and checks whether the current table—(b,0) (d,0) (e,0) (c,1)—is equal to the previous table—(b,0) (d,0) (e,0). Because the tables are not equal, the process replaces the contents of the previous table with the contents of the current table. The process is now at the end of stage 1.

Beginning stage 2, the process evaluates the entire term, using the previous table, now containing (b,0) (d,0) (e,0) (c,1), as the recursive reference. The non-recursive term, as always, yields (b,0) (d,0) (e,0). The recursive term is now max* ((a,b) (a,c) (c,d) (c,e), (b,1) (d,1) (e,1) (c,2))=(c,1) (a,2)

The process forms the union of these two results, yielding a table containing (b,0) (d,0) (e,0) (c,1) (a,2).

This is the result at the end of stage 2, as shown above.

Aggregations with Tuple Types or Multiple Columns

The depth query is a simple one, for which the relation s, i.e., edges in the example above, is binary, with a scalar domain and a scalar range. That is, both the domain and range of s can be represented as a single column. However, the domain and range of s are not necessarily scalars, as noted above. When representing s as an SQL table, if s has a tuple domain or range, the domain or range must be represented as multiple columns, and it may then be necessary to specify a schema for s to allow the evaluation engine to determine which columns of s represent the domain, and which columns represent the range. As a very simple example, the language could adopt the convention that the columns of s are ordered so that the first n columns represent the domain, and the rest represent the range. One could then include a term n in the aggregation construct, by which the language evaluator could uniquely determine the domain and range of s. The same could be done with respect to the relation t. More sophisticated schemas are possible as well.

In other query languages such as Datalog where table columns always have names, the correspondence between the schemas of s and t can be managed using the corresponding names ("variables" in Datalog).

Evaluation Over Graph with Cycles

As noted above, one benefit of the monotonicity of the new aggregation construct is that it guarantees a fixed point in recursive queries, thus providing correct results when calculating over a tree, where a naive approach might produce an incorrect result. A further benefit of monotonicity is that when evaluating a recursive query over a graph with cycles, the monotonic aggregate will produce a correct result, whereas a naive approach may simply loop forever, producing no result at all.

Figure 5:
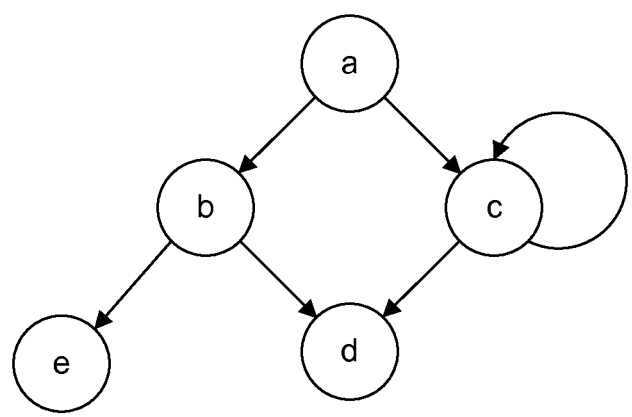
FIG. 5 illustrates a simple cyclic graph that will be used in examples presented in this specification.

Consider the depth query over the simple cyclic graph shown in FIG. 5. Using the aggregation construct semantics described above will produce the following correct results: (e, 0), (d, 0), (b, 1). Note that the these results give no depth at all to nodes a and c. This is the only sensible conclusion to come to when asking the depth of a node whose path to a leaf contains a loop, because the definition of depth is the length of the longest path from the node to a leaf. If that path contains a loop, there is no longest path to a leaf.

Aggregation Construct in Datalog

The aggregation construct is useful in other languages as well. This will be illustrated, for convenience, using a form of Datalog that supports expressions and negation. However, these extended features of Datalog are independent of the aggregation semantics described by this specification, which can be applied to any variant of Datalog.

In Datalog, the node relation for the example graph of FIG. 1 can be defined as follows:

node(n):−n="a"; n="b"; n="c"; n="d"; n="e"

The node relation contains a node n if the node is a, b, c, d, or e. The semicolon denotes "inclusive or".

The graph edge relation can be defined as follows; the comma denotes "and":

| edge (p, c) | :- | (p = "a", c = "b") |
|---|---|---|
| | ; | (p = "a", c = "c") |
| | ; | (p = "c", c = "d") |
| | ; | (p = "c", c = "e") |

The aggregation construct can be added into Datalog with the following syntax; however, any other convenient syntax expressing the same overall semantics could be used:

agg*(<result>,
    <to_agg>|<variables>|<range>|<term>)

This term defines a relation between the variable <result> and the free variables in <range>. In this form of the construct:

agg is any aggregation function, e.g., max, sum, and so on;
<result> is the variable that will be equal to the aggregated value;
<to_agg> is the variable used in <term> that will contain the values to be aggregated;
<variables> is a list of variables that are local to the expressions <range> and <term>;
<range> is a relation between free variables and the variables <variables>; and
<term> is a relation between the variables in <variables> and <to_agg>; that is, it defines the values to be aggregated by the aggregation function agg.

Any variable used in <term> must either be <to_agg> or be listed in <variables>. Only <term> can contain a recursive reference.

To calculate depth using the this syntax, a person could write:

depth (n, d):–
(not edge(n,_), d=0)
; (edge(n,_), d=f+1
, max*(f, e|c|edge (n, c)|depth (c, e)))

Here max* will produce a relation between f and the free variables in edge(n, c). The variables mentioned in edge(n, c) are c and n. But since c is bound inside the max* expression, that is, since c occurs in <variables>, the only free variable is n. Therefore, max* will produce a relation between f and n. Specifically, for a node n, max* will relate f, the maximum depth of all n's child nodes, with n, but only if all the child nodes of n have a depth value associated with them.

This aggregation has precisely the same semantics as the SQL aggregation. Here, <range> defines relation s, with the domain being free variables, and the range being variables listed in <variables>. The relation s is edge(n, c) in the present example and the edge table in the SQL example. And <term> defines relation t, with the domain being the variables listed in <variables> and the range being <to_agg>. The relation t is depth(c, e) in the present example and select node, depth+1 from depth_table in the SQL example.

Note that free variables can only appear in <range> and not in <term>. This is done to simplify the semantics; and although this may appear to be a restriction, it is not. If the query writer wishes to use a free variable in <term>, the writer can simply bind the free variable to a local variable in <range> and then use that local variable in <term>. For example, the form rel(n,v):–sum*(v, e|c|edge(n,c)|myrel(n,c,e))

does not conform to the foregoing definition, because the free variable n appears in <term>, i.e., in myrel(n,c,e). However, the query writer can achieve the desired result of this with a local variable bound to the free variable in <range> by writing:

rel(n,v):–sum*(v, e|c, n1|n1=n, edge(n,c)|myrel(n1,c,e))

This yields the desired behavior with no free variables in <term>.

In addition, an implementation could allow query writers to include free variables in <term>, because it is quite simple for an evaluator to automatically detect free variables in <term>, and to insert local variables bound to the free variables in <range> in their place.

More on Aggregations with Tuple Types or Multiple Columns

As noted above, in the aggregation construct, the domain and range of relations s or t can be tuple types, that is, when representing s or t as a table, the domain or range or both could contain more than one column.

A simple example of a Datalog query, though a non-recursive one, that uses an aggregation construct with more than one bound variable, and thus with a relation s that has a range of more than one column, is the following largest_gap, which finds the manager-employee pair with the largest gap in pay:

largest_gap(g):–
max*(g, gap //<result>, <to_agg>
|m, e //<variables>
|manages(m, e) //<range>
|exists(se, sm|salary(e, se), salary(m, sm), gap=sm–se)
//<term>
)

In this example, there are no free variables at all, so a dummy free variable must be used. This is because max * is defined to return a relation from free variables to aggregated variables. If the set of free variables is empty, the relation must be empty as well. Therefore a dummy free variable, containing only the value 1, will be used. The following employee-salary table (Table 4) and manager-employee table (Table 5) will be used for this example:

TABLE 4

| employee | salary |
|---|---|
| 'Alice' | 80,000 |
| 'Bob' | 85,000 |
| 'Charlie' | 90,000 |
| 'Doug' | 95,000 |
| 'Emily' | 100,000 |
| 'Frank' | 110,000 |
| 'Gail' | 115,000 |
| 'Helen' | 120,000 |

TABLE 5

| manager | employee |
|---|---|
| 'Frank' | 'Alice' |
| 'Frank' | 'Bob' |
| 'Frank' | 'Charlie' |
| 'Gail' | 'Doug' |
| 'Gail' | 'Emily' |

For this example data and the above aggregation construct max*, the following relations s and t are generated.

RELATION S

| dummy | manager | employee |
|---|---|---|
| 1 | 'Frank' | 'Alice' |
| 1 | 'Frank' | 'Bob' |
| 1 | 'Frank' | 'Charlie' |
| 1 | 'Gail' | 'Doug' |
| 1 | 'Gail' | 'Emily' |

RELATION T

| manager | employee | gap |
|---|---|---|
| 'Frank' | 'Alice' | 30,000 |
| 'Frank' | 'Bob' | 25,000 |
| 'Frank' | 'Charlie' | 20,000 |
| 'Gail' | 'Doug' | 20,000 |
| 'Gail'' | 'Emily' | 15,000 |

The result of the aggregation is the relation shown in Table 6.

TABLE 6

| dummy | max gap |
|---|---|
| 1 | 30,000 |

Multiple columns were used to represent multiple bound variables in the aggregation.

Similarly, multiple columns could be used to represent multiple free variables, should they exist. As noted above, in case of ambiguous multicolumn tables where it is not clear what the respective domains and ranges of s and t are, some schema could be supplied to make the tables unambiguous. In the case of the Datalog interpreter, this is not necessary, since all columns in Datalog are named, and the names allow the interpreter to match up the range of s with the domain of t.

In the case of Datalog, a Datalog interpreter or compiler could detect that the list of free variables is empty, and could automatically insert the dummy unary relation for the free-variable relation, and could also automatically strip the dummy out of the resulting relation. In the case of SQL, this behavior could be implemented if the supplied schema indicates that s has a trivial domain.

The aggregation construct can be implemented in any data language, including a data language implemented as a sub-language of any programming language, that implements the fixed point semantics described above. The data language may, but need not, implement the particular syntax structures described above. Any form of expression that is compatible with the data language can be used to express the aggregation construct. The expression should include language elements specifying, explicitly or implicitly, an aggregation function, an aggregation variable, one or more free variables, one or more bound variables, a range relation from the one or more free variables to one or more of the bound variables, and an aggregation-input relation from the bound variables to the aggregation variable. If the compiler or interpreter of the data language is properly implemented, the expression will evaluate to a relation between the one or more free variables and the output type of the aggregation function applied to the aggregation variable, according to the semantics described above. One straightforward way of implementing any such data language is to translate its expressions to SQL and process the result with an SQL compiler or interpreter.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
   one or more computers and one or more storage devices storing instructions that are operable, when executed by the one or more computers, to cause the one or more computers to perform operations comprising:
   receiving program input specifying an aggregation function agg having an input type and an output type, a relation s that has a domain and a range, wherein s represents one or more entities to be aggregated over, and a relation t that is a relation from the range of s to the input type of the aggregation function agg;
   evaluating an aggregation construct agg* to calculate a relation between the domain of s and the output type of the agg function according to $$\text{agg}^*(s,t) = \{(m, \text{agg}(n)) \mid \exists d : (m,d) \in s, n \in \pi\{|t(y)| y \in s(m)|\}\}$$

wherein agg* returns a relation and is monotonic in the relation t;
   receiving program input in which the aggregation construct agg* is within a recursive term of a recursive relation definition; and
   evaluating the recursive relation definition.

2. The system of claim 1, wherein the aggregation function agg is a sum, average, count, min, max, product, or concatenation function.

3. The system of claim 1, wherein the program input comprises an expression in a data language that uses fixed point semantics.

4. The system of claim 3, wherein the data language is SQL or Datalog.

5. The system of claim 1, wherein receiving program input specifying an aggregation function agg having an input type and an output type comprises:
   receiving program input comprising language elements specifying, explicitly or implicitly, the aggregation construct for the aggregation function agg, the aggregation function agg having multiple input types, and a relation t that is a relation from the range of s to the multiple input types of the aggregation function agg.

6. The system of claim 5, wherein the aggregation function agg is a sum, average, count, min, max, product, or concatenation function.

7. The system of claim 5, wherein the program input comprises an expression in a data language that uses fixed point semantics.

8. The system of claim 7, wherein the data language is SQL or Datalog.

9. The system of claim 1, wherein receiving program input specifying an aggregation function agg having an input type and an output type comprises:
   receiving program input that explicitly specifies the aggregation function agg, the relation s, the relation t, and the aggregation construct agg*.

10. A system comprising:
    one or more computers and one or more storage devices storing instructions that are operable, when executed by the one or more computers, to cause the one or more computers to perform operations comprising:
    receiving program input specifying an aggregation function agg and arguments for an aggregation construct agg* for the aggregation function agg, wherein the aggregation construct agg* is within a recursive term of a recursive relation definition, the arguments including, explicitly or implicitly:
    <to_agg>, a variable that will contain values to be aggregated;
    <variables>, one or more variables that are local to the expressions <range> and <term>;
    <range>, a constraint on the values of the variables <variables> that defines a relation s, wherein the domain of s is free variables and the range of s is variables listed in <variables>; and
    <term>, a constraint that constrains <to_agg> to values that will be aggregated, which defines a relation t that has a domain and a range, wherein the domain of t is the variables listed in <variables> and the range of t is <to_agg>; and evaluating the recursive relation definition, including evaluating the aggregation construct agg* for the aggregation function agg according to the semantics $$agg^*(s,t)=\{(m,agg(n))|\exists d:(m,d)\in s, n\in \pi\{|t(y)|y\in s(m)|\}\}$$

wherein agg* returns a relation and is monotonic in the relation t.

11. The system of claim 10, wherein the agg function is a sum, average, count, min, max, product, or concatenation function.

12. The system of claim 10, wherein the program input comprises an expression in a data language that used fixed point semantics.

13. The system of claim 10, wherein the operations further comprise:
receiving program input specifying <to_agg> explicitly.

14. The system of claim 10, wherein receiving program input specifying arguments for the aggregation construct agg* comprises receiving arguments that explicitly include <to_agg>, <variables>, <range>, and <term>.

15. One or more non-transitory computer-readable storage media encoded with instructions that, when executed by one or more computers, cause the one or more computers to perform operations comprising:
receiving input specifying, explicitly or implicitly, an aggregation function agg having an input type and an output type, a relation s that has a domain and a range, wherein s represents one or more entities to be aggregated over, and a relation t that is a relation from the range of s to the input type of the aggregation function agg; and
evaluating an aggregation construct agg* to calculate a relation between the domain of s and the output type of the aggregation function agg according to $$agg^*(s, t)=\{(m,agg(n))|\exists d:(m,d)\in s, n\in \pi\{|t(y)|y\in s(m)|\}\}$$

wherein agg* returns a relation and is monotonic in the relation t;
receiving input in which the aggregation construct agg* is within a recursive term of a recursive relation definition; and
evaluating the recursive relation definition.

16. The one or more non-transitory computer-readable storage media of claim 15, wherein the aggregation function agg is a sum, average, count, min, max, product, or concatenation function.

17. The one or more non-transitory computer-readable storage media of claim 15, wherein the input comprises an expression in a data language that uses fixed point semantics.

18. The one or more non-transitory computer-readable storage media of claim 17, wherein the data language is SQL or Datalog.

19. The one or more non-transitory computer-readable storage media of claim 15, wherein receiving program input specifying an aggregation function agg having an input type and an output type comprises:
receiving program input that explicitly specifies the aggregation function agg, the relation s, the relation t, and the aggregation construct agg*.

20. One or more non-transitory computer-readable storage media encoded with instruction that, when executed by one or more computers, cause the one or more computers to perform operations comprising:
receiving program input specifying an aggregation function agg and arguments for an aggregation construct agg* for the aggregation function agg, wherein the aggregation construct agg* is within a recursive term of a recursive relation definition, the arguments including, explicitly or implicitly:
<to_agg>, a variable that will contain values to be aggregated;
<variables>, one or more variables that are local to the expressions <range> and <term>;
<range>, a constraint on the values of the variables <variables> that defines a relation s, wherein the domain of s is free variables and the range of s is variables listed in <variables>; and
<term>, a constraint that constrains <to_agg> to values that will be aggregated, which defines a relation t that has a domain and a range, wherein the domain of t is the variables listed in <variables> and the range of t is <to_agg>; and
evaluating the recursive relation definition, including evaluating the aggregation construct agg* for the aggregation function agg according to the semantics $$agg^*(s, t)=\{(m, agg(n))|\exists d:(m, d)\in s, n\in \{|t(y)|y\in s(m)|\}\}$$

wherein agg* returns a relation and is monotonic in the relation t.

21. The one or more non-transitory computer-readable storage media of claim 20, wherein the agg function is a sum, average, count, min, max, product, or concatenation function.

22. The one or more non-transitory computer-readable storage media of claim 20, wherein the program input comprises an expression in a data language that uses fixed point semantics.

23. The one or more non-transitory computer-readable storage media of claim 20, wherein the operations further comprise:
receiving program input specifying <to_agg> explicitly.

24. The one or more non-transitory computer-readable storage media of claim 20, wherein receiving program input specifying arguments for the aggregation construct agg* comprises receiving arguments that explicitly include <to_agg>, <variables>, <range>, and <term>.

* * * * *

UNITED STATES PATENT AND TRADEMARK OFFICE
CERTIFICATE OF CORRECTION

| | |
|---|---|
| PATENT NO. | : 9,015,193 B1 |
| APPLICATION NO. | : 14/292581 |
| DATED | : April 21, 2015 |
| INVENTOR(S) | : Oege de Moor |

It is certified that error appears in the above-identified patent and that said Letters Patent is hereby corrected as shown below:

IN THE SPECIFICATION

Column 6, Line 49: Delete "$\{\{|\, 1,\, 1\, \}\}\}$" and insert --$\{\{|\, 1,1\, |\}\}$--; and Column 7, Line 2: Delete "$|\, \Sigma d\!:$" and insert --$|\, \exists d\!:$--.

Signed and Sealed this
Twenty-seventh Day of October, 2015

Michelle K. Lee
*Director of the United States Patent and Trademark Office*